United States Patent
Kanehira et al.

(10) Patent No.: US 6,325,735 B1
(45) Date of Patent: Dec. 4, 2001

(54) SILENT CHAIN

(75) Inventors: Makoto Kanehira; Kazumasa Matsuno; Hitoshi Ohara; Shigekazu Fukuda; Hiroshi Horie; Takayuki Funamoto; Yoshihiro Kusunoki; Masao Maruyama, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 11 days.

(21) Appl. No.: 09/586,310

(22) Filed: Jun. 2, 2000

(30) Foreign Application Priority Data

Jun. 3, 1999 (JP) .................................. 11-156786

(51) Int. Cl.⁷ .............................. F16G 13/04; F16H 7/06
(52) U.S. Cl. ........................................... 474/212; 474/206
(58) Field of Search ................................. 474/212, 213, 474/214, 215, 216, 217, 202, 206

(56) References Cited

U.S. PATENT DOCUMENTS

| | | | |
|---|---|---|---|
| 4,345,904 | 8/1982 | Numazawa et al. | 474/215 |
| 5,114,384 | 5/1992 | Tsuyama | 474/212 |
| 5,236,400 | * 8/1993 | Tauyama | 474/217 |
| 5,267,910 | 12/1993 | Maruyama et al. | 474/212 |
| 5,419,743 | * 5/1995 | Takeda et al. | 474/215 X |
| 5,427,580 | 6/1995 | Ledvina et al. | 474/84 |
| 5,437,581 | 8/1995 | Ledvina et al. | 474/85 |
| 5,453,059 | 9/1995 | Avramidis et al. | 474/212 |
| 5,470,282 | 11/1995 | Ledvina et al. | 474/156 |
| 5,507,697 | 4/1996 | Ledvina et al. | 474/85 |
| 5,551,925 | 9/1996 | Mott et al. | 474/85 |
| 5,562,557 | 10/1996 | Ledvina et al. | 474/84 |
| 5,628,702 | 5/1997 | Kotera | 474/213 |
| 5,683,319 | 11/1997 | Mott et al. | 474/85 |
| 5,799,479 | 9/1998 | Tanaka | 59/4 |
| 5,816,967 | 10/1998 | Ledvina et al. | 474/84 |
| 5,846,149 | 12/1998 | Ledvina et al. | 474/84 |
| 5,902,203 | 5/1999 | Kanehira et al. | 474/213 |
| 6,244,983 | * 6/2001 | Matsuda | 474/212 X |

FOREIGN PATENT DOCUMENTS

| | | | |
|---|---|---|---|
| 43 16 877 A1 | 11/1993 | (DE) . | |
| 164042 | * 8/1985 | (JP) | 474/212 |
| 1-56304 | 7/1987 | (JP) . | |
| 8200866 | * 3/1982 | (WO) | 474/212 |

* cited by examiner

Primary Examiner—Mary Ann Green
(74) Attorney, Agent, or Firm—Howson & Howson

(57) ABSTRACT

A silent chain includes guide links and articular links arranged in the longitudinal direction of the chain. The guide links each include one or more guide link plates, and the articular links each include two or more articular link plates. When the chain is in the straight-line state, the inside flank of each meshing tooth of any one of the link plates projects outwardly from the outside flank of each meshing tooth of another laterally adjacent one of the link plates. The projecting length of the inside flank relative to the outside flank is allowed to vary between the adjacent links, either in a random fashion or in a regular alternate fashion, along the length of the chain. By thus providing different projecting lengths of the chain's inside tooth flanks, the sliding engagement start time of sprocket teeth relative to the inside tooth flanks of the individual link plates is allowed to vary between the adjacent links, so that the periodic meshing sounds can be prevented from resonating to get louder, with the result that the overall noise level can be minimized.

8 Claims, 5 Drawing Sheets

SILENT CHAIN

BACKGROUND OF THE INVENTION

1. Field of the Invention

The present invention relates to a silent chain which is constructed to reduce noises generated when meshing with a sprocket and to improve the lifetime of the chain.

2. Description of the Related Art

Silent chains are used extensively for a variety of purposes, such as power transmission between an engine crank-shaft and a camshaft in an automotive vehicle. These silent chains include a plurality of rows of link plates serially interconnected or articulated with each other, and each of the link plates is in a virtually bifurcated or V shape to provide, at its opposite ends, a pair of meshing teeth which are directly meshable with successive teeth of a sprocket wheel. More specifically, outside or inside flanks of these teeth are sequentially brought into a power-transmitting contact with the sprocket teeth.

FIG. 5 shows one example of the conventional silent chains which is disclosed in Japanese Patent Publication No. HEI-1-56304. The disclosed silent chain 50, for the purpose of reducing an impact and noises during power-transmitting meshing operation thereof, includes an inside flank 52 of arcuate convex profile and an outside flank 54 of straight profile which jointly form each tooth 56 of one link plate. When the silent chain 50 is in a straight-line state, the arcuately convex inside flank 52 of one link plate projects outwardly from the straight outside flank 54 of the preceding link plate.

FIG. 5 also illustrates an operational sequence in which the link plates of the silent chain 50 sequentially mesh with teeth of a sprocket S. At the onset of meshing engagement between the link plates of the silent chain 50 and the teeth of the sprocket S, the arcuate convex inside flanks 52 of the link plate are caused to interfere with and then slide along the sprocket teeth, as achieved at the position of a tooth T1 of the sprocket S. When the link plates of the silent chain 50 are placed in full meshing engagement with the sprocket teeth, the straight outer flanks 54 of the link plates are completely seated on the sprocket teeth, as achieved at the position of another tooth T2 of the sprocket S. By the meshing engagement between the outside flanks 54 of the link plates and sprocket teeth thus acheived, the silent chain achieves its power-transmitting operation between, for example, a crankshaft and a camshaft in an engine.

In the case of the link plates having the combination of an arcuate convex inside flank 52 and a straight outside flank 54, a problem arises in that the projecting length of the arcuately convex inside flank 52 becomes excessively large at a central portion of the inside flank 52, thereby hindering smooth intermeshing engagement between the silent chain 50 and the sprocket S. If the projecting length at the central portion of the arcuate convex inside flank 52 is made small, a sufficient noise-suppressing effect cannot be attained partly due to insufficient interference between the inside flank 52 and the sprocket tooth occurring in the vicinity of a tip of each tooth of the link plate, and partly due to a delay in timing of the meshing operation.

In addition, due to the excessive projectina length at the central portion of the arcuately convex inside flank 52, wear of the inside flanks 52 and the sprocket tooth occurs in a relatively short time, making it difficult to maintain the prescribed noise-suppressing effect of the silent chain.

SUMMARY OF THE INVENTION

With the foregoing drawbacks of the prior art in view, it is an object of the present invention to provide a silent chain which can minimize undesired meshing sounds or noise produced by meshing engagement between the silent chain and a sprocket.

Another object of the present invention is to provide a silent chain which can minimize wear of the silent chain and a sprocket occurring due to meshing engagement between the silent chain and the sprocket, thereby maintaining the prescribed noise suppressing effect over a long period of use.

A further object of the present invention is to provide a silent chain which can effectively prevent the unwanted resonance of the meshing sounds and thereby minimize the noise level.

In order to accomplish the above-mentioned object, the present invention provides a silent chain for use with a toothed sprocket, which includes guide links and articular links alternately arranged in the longitudinal direction of the chain. Each of the guide links has a pair of guide plates and at least one guide link plate disposed laterally between the guide plates. The guide plates each have a pair of pin holes spaced in the longitudinal direction of the chain, and the guide link plate has a pair of pin holes spaced in the longitudinal direction of the chain. Each of the articular links has at least two laterally aligned articular link plates each having a pair of pin holes spaced in the longitudinal direction of the chain. Each of the guide links and an adjacent one of the articular links are articulately connected together by a pivot pin inserted through one of the pair of pin holes in each of the guide plates, one of the pair of pin holes in the guide link plate and one of the pair of pin holes in each of the articular link plates. The guide link plate has a pair of teeth designed to engage the sprocket, each of the teeth being defined by an inside flank having a straight profile and an outside flank having a straight profile. The articular link plates each have a pair of teeth designed to engage the sprocket, each of the teeth being defined by an inside flank having a straight profile and an outside flank having a straight profile.

When the silent chain is in a straight-line state, the inside flank of the guide link plate of any one of the guide links projects outwardly from the outside flank of each of the articular link plates of a preceding one of the articular links, and the inside flank of each of the articular link plates of any one of the articular links projects outwardly from the outside flank of the guide link plate of a preceding one of the guide links.

When the silent chain is wrapping itself around the sprocket with the adjacent guide and articular links being in a flexed state, the inside flank of the guide link plate of any one of the guide links retracts inwardly from the outside flank of each of the articular link plates of a preceding one of the articular links, and the inside flank of each of the articular link plates of any one of the articular links retracts inwardly from the outside flank of the outside flank of the guide link plates of a preceding one of the guide links.

The outside flank of the guide link plate and the outside flank of each articular link plate have the same shape and configuration. One of the guide link plate and each articular link plate is comprised of at least two types of link plates arranged in the longitudinal direction of the chain and each having a different inside flank designed such that when the chain is in the straight-line state, the inside flank of a first link plate of the at least two types of link plates has a first projecting length with respect to the outside flank of the other of the guide link plate and each the articular link plate of the preceding link, and the inside flank of a second link plate of the at least two types of link plates has a second projecting length with respect to the outside flank of sand other link plate of the preceding link, the first and second projecting lengths being different from each other.

In one preferred form, the other link plate is comprised of a single type of link plate and identical in shape and configuration with one of the first and second link plates.

The first and second projecting lengths of the respective inside flanks of the first and second link plates may be uniform throughout the length of the inside flanks or may vary by either increasing, or alternatively decreasing, gradually toward a tip of the associated tooth.

In response to rotation of the sprocket, a silent chain link plate at the point of coming into meshing engagement with the sprocket teeth (i.e., "about-to-mesh link plate") is caused to pivot about a pivot pin inserted through a trailing tooth of a laterally adjacent link plate, immediately preceding the about-to-mesh link plate, whose outside flanks of the two meshing teeth have already been completely seated on the sprocket teeth. Thus, the inside flank of the leading tooth of the link plate and the inside flank of the leading tooth of another laterally adjacent plate immediately succeeding the about-to-mesh link plate sequentially interfere with and then slide along the sprocket teeth. At that time, frictional resistance produced between the inside flanks of these successive link plates and the sprocket teeth can effectively damp the impact of collision that would be produced when the link plates are brought into meshing engagement with the sprocket teeth and thereby suppress generation of the undesired meshing sounds.

As the silent chain advances further due to the rotation of the sprocket, the about-to-mesh link plate is caused to pivot further, about the pivot pin shared with the already-seated preceding link plate, so that the inside flank of the leading tooth of the link plate leaves the sprocket tooth and then the outside flank of the same meshing tooth is caused to project outward from the inside flank of the leading tooth and is subsequently seated on the succeeding sprocket tooth.

Immediately before the about-to-mesh plate is completely seated on the sprocket teeth, the succeeding plate, having so far interfered at the inside flank of its leading tooth with the sprocket tooth, is caused to retract the inside flank rearwardly (as viewed in the advancing direction of the chain) of the outside flank of the trailing tooth of the preceding plate, due to its pivoting movement about the pivot pin shared with the about-to-mesh link plate, so that the interference with the sprocket tooth is lost and the outside flank of the trailing tooth of the about-to-mesh link plate is seated on the succeeding sprocket tooth.

According to the present invention thus constructed, repetition of the above-mentioned operational sequence allows the respective outside flanks of the plates, serially connected via the pivot pins, to be sequentially seated on the sprocket teeth.

In the present invention, the respective inside flanks of the link plates are caused to interfere successively with, and then slide along, the sprocket teeth while the area of interference between the inside flanks and the sprocket teeth increases gradually. The inside flanks have a straight profile and, hence, the interference between the straight inside flanks and the sprocket teeth is considerably smaller than the excessively large interference experienced in the prior art between the arcuately convex inside flanks and the sprocket teeth.

When the seating engagement between one sprocket teeth and the inside flank of a the link plates is taken over by the seating engagement between the same sprocket tooth and the outside flank of a laterally overlapping link plate, the outside flank, due to its pivotal movement about an associated pivot pin, is caused to project gradually rearwardly from the inside flank of the one link plate, in a manner similar to that of two opposed blades of a pair of scissors being opened, to thereby interfere with the same tooth of the sprocket. Such interference of the outside flank with the sprocket tooth can effectively damp or buffer an impact and meshing sounds that would occur as the outside flank contacts and becomes seated on the sprocket tooth.

In addition, when the silent chain is in the straight-line state, two or more different projecting lengths of the inside flanks are provided. Thus, the sliding engagement start time of the sprocket teeth relative to the inside flanks of the individual link plates is allowed to change variously between the adjacent links, so that the periodic meshing sounds can be prevented from resonating and thereby getting louder, with the result that the overall noise level can be minimized. An enhanced resonance preventing effect can be obtained when the two or more different types of link plates are arranged irregularly in a random mixture along the length of the silent chain.

The projecting length of the inside flanks may vary to either increase or decrease gradually toward tips of the meshing teeth so as to effectively suppress the meshing sounds. By the inside-flanks' projecting length varying to decrease gradually toward the tooth tips, the engagement start time of the outside flanks relative to the sprocket teeth can be advanced. In contrast, the inside-flanks' projecting length varying to increase gradually toward the tooth tips allows the radial position on the chain's outside flanks with which the sprocket teeth mesh to shift toward the tooth root side.

BRIEF DESCRIPTION OF THE DRAWINGS

A certain preferred embodiment of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
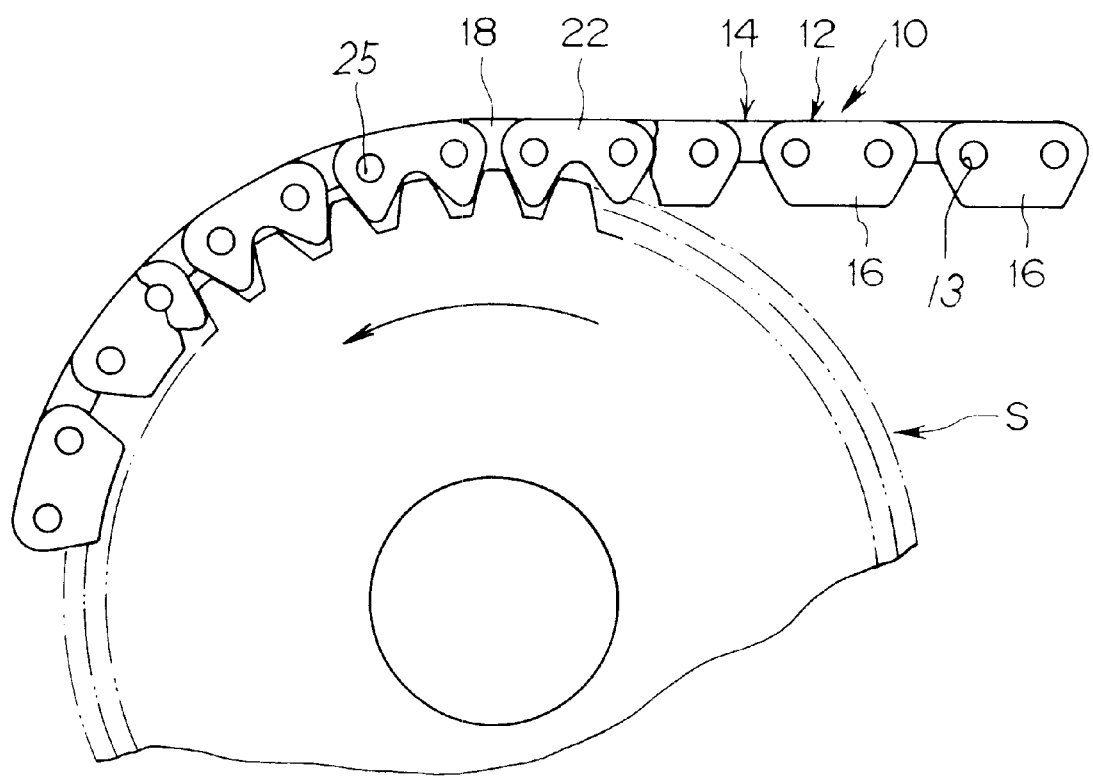
FIG. 1 is a fragmentary front elevational view of a silent chain used with a sprocket in accordance with one embodiment of the present invention.
Figure 2:
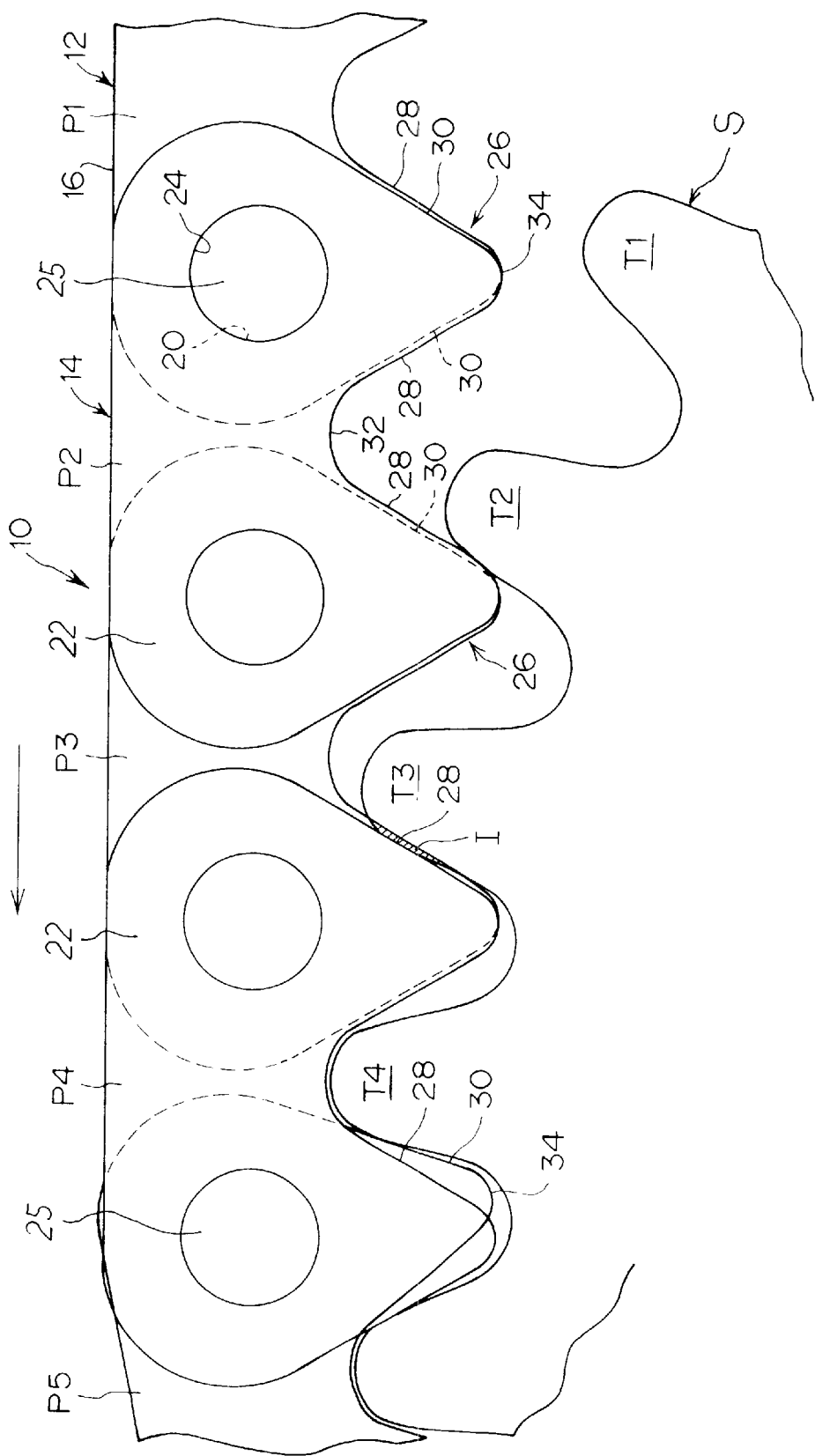
FIG. 2 is an enlarged fragmentary front elevational view explanatory of an operational sequence in which link plates of the silent chain sequentially mesh with teeth of the sprocket.

Referring now to the drawings and FIGS. 1 and 2 in particular, there is shown a silent chain 10 according to an embodiment of the present invention, which is used in combination with a sprocket S. The silent chain 10 includes guide links 12 and articular links 14 alternately arranged in the longitudinal direction of the silent chain 10. The guide links 12 and the articular links 14 are connected together in an endless fashion.

Each of the guide links 12 has a pair of guide plates 16 and at least one guide link plate 18 disposed laterally between the guide plates 16. The thickness and number of the guide link plate la are determined depending on the desired power transmitting capacity. The guide plates 16 each have a pair of pin holes 13 (FIG. 1) spaced in the longitudinal direction of the silent chain 10, and the guide link plate 18 has a pair of pin holes 20 (FIG. 2) spaced in the longitudinal direction of the silent chain 10. The guide plates 16 are not shown in FIG. 2.

Each of the articular links 14 has at least two laterally aligned articular link plates 22 each having a pair of pin holes 24 (FIG. 2) spaced in the longitudinal direction of the silent chain 10. The number of articular link plates 22 is one more than the number of the guide link plate 18 in the guide links 12.

In each pair consisting a of guide link 12 and an adjacent articular link 14, the guide plates 16, the guide link plate 18 and the articular link plates 22 are articularly connected together by a pivot pin 25 inserted through the respective laterally aligned pin holes 13, 20, 24 of the plates 16, 18, 22. The pivot pin 25 may be comprised of a single round pin as shown or a pair of rocker joint pins not shown.

When the silent chain 10 is in mesh with teeth T of the sprocket S. the guide plates 16 are properly guided on opposite side surfaces of the sprocket S, thereby preventing the silent chain 10 from being accidentally detached laterally from the sprocket S. Since the guide links 12, including the guide plates 16, are likely to have a greater thickness than the articular links 14, it may be possible to make the thickness of the articular link plates 22 smaller than the thicknesses of the guide plates 16 and guide link plates 18 or to reduce the thickness of the guide plates 16.

In the silent chain 10 of the present invention, the guide link plate 18 and the articular link plates 22 generally have the same shape and configuration. The guide and articular link plates 18, 22 each have a virtually bifurcated or V-shaped configuration to provide a pair of spaced meshing portions or teeth 26, 26 on one longitudinal side of the link plate (corresponding to the inner circumferential side of the silent chain 10). Each of the teeth 26 is defined by an inside flank 28 having a straight profile and an outside flank 30 having a straight profile. In the illustrated embodiment, the inside flank 28 of the leading or trailing (or left or right) tooth 26 of one link plate 18, 22 and the outside flank 30 of the trailing or leading tooth 26 of another laterally adjacent link plate 22, 18 are designed to lie parallel with each other when the silent chain 10 is in the straight-line state, The respective inside flanks 28, 28 of the teeth 26 are symmetrically profiled and connected together by an arcuately concave crotch 32. The inside and outside flanks 28, 30 of each tooth 26 converge together at a tip 34 of the tooth 26. Power transmission between the silent chain 10 and the sprocket S is achieved via meshing engagement between the teeth T of the sprocket S and the teeth 26 of the link plates 18, 22 of the silent chain 10.

When the silent chain 10 is in the straight-line state, the inside flank 28 of the guide link plate 18 of any one of the guide links 12 projects outwardly from the respective outside flanks 30 of the articular link plates 22 of a preceding one of the articular links 14, and similarly, the respective inside flanks 28 of the articular link plates 22 of any one of the articular links 14 project outwardly from the outside flank 30 of the guide link plate 18 of a preceding one of the guide links 12.

On the other hand, when the silent chain 10 is wrapping itself around the sprocket S with the adjacent guide and articular links 12, 14 being bent in a flexed state, the inside flank 28 of the guide link plate 18 of any one of the guide links 12 retracts inwardly from the respective outside flanks 30 of the articular link plates 22 of a preceding one of the articular links 14, and similarly, the respective inside flanks 28 of the articular link plates 22 of any one of the articular links 14 retract inwardly from the outside flank 30 of the outside flank of the guide link plate 18 of a preceding one of the guide links 12.

By thus arranging the inside flanks 28 relative to the adjacent outside flanks 30, the teeth T of the sprocket S are able to come into contact with the inside flanks 28, then start sliding along the inside flanks 28, subsequently continue interference with the inside flanks 28, and thereafter come into contact with the outside flanks 30. Power transmission is effected while the outside flanks 30 are seated on the sprocket tooth T.

Turning now to FIG. 2, a description will be given of the manner in which the above-described silent chain 10 meshes with the sprocket S.

As the sequential power-transmitting engagement progresses between the silent chain 10 and the sprocket S, the guide link plate 18 in one guide link 12 or the articular link plates 22 of one articular link 14 (hereinafter referred to, for brevity, as "plate P1") have their meshing teeth 26 completely separated from the tooth T1 of the sprocket S. As the operation further progresses, a preceding plate P2 starts sliding engagement with the sprocket tooth T2 at a tip side of the inside flank 28 of the leading (left) tooth 26 of the preceding plate P2.

In this instance, the sprocket tooth T2 is held out of contact with the outside flank 30 of the trailing tooth 26 of another plate 23 ahead of the plate P2, and so no driving force is transmitted from the sprocket S to the silent chain 10.

As the sequential power-transmitting engagement further progresses between the silent chain 10 and the sprocket S, the sprocket tooth T3 advances from the position taken by the sprocket tooth T2 to the position shown in FIG. 2 during which time the sprocket tooth T3 interferes with the inside flank 28 of the leading tooth 26 of the plate P3 at a buffer region I depicted by hatching for clarity in FIG. 2, whereas the sprocket tooth T3 does not contact with the outside flank 30 of the trailing tooth 26 of a plate P4 ahead of the plate P3. Thus, no driving force from the sprocket S acts on the silent chain 10.

Because the inside flanks 28 have a straight profile rather than an arcuately convex profile, the sprocket teeth T undergo gradual interference with the inside flanks 28 without causing undue interference which would occur in the prior art apparatus. In practice, the sprocket teeth T do not bite into the teeth 26 of the plates P1–P4 because the plates and the sprocket S undergo slight elastic deformation while the plates of the silent chain 10 are advancing.

A further progress of the sequential power-transmitting engagement between the silent chain 10 and the sprocket S causes a plate PS, ahead of the plate P4, to change its posture while the plate P4 maintains its previous posture aligned with the succeeding plates P3, P2 and P1. The plate P5 is caused to pivot counterclockwise about the pivot pin 25 interconnecting the plate P5 and the plate P4, whereby the outside flank 30 of the trailing tooth 26 of the plate P5 projects gradually and outwardly from the inside flank 28 of the leading tooth 26 of the plate 24 in such a manner that the projecting length of the inside flank 28 relative to the outside flank 30 increases gradually from the crotch side toward the tip 34 of the tooth, as achieved when two opposed blades of a pair of scissors is opened. Thus, as the silent chain 10 advances by one tooth pitch, the sprocket tooth T4 transfers itself from the inside flank 28 of the leading tooth 26 of the plate P4 to the outside flank 30 of the trailing tooth 26 of the plate P5. By thus transferring the sprocket tooth T4, at the time immediately before the onset of meshing engagement of the silent chain 10 and the sprocket S, the outside flank 30 of the trailing tooth 26 of the plate P5 can be brought into a soft, quiet landing on the sprocket tooth T4 without hard collision therewith.

Then, following sets of the guide and articular link plates 18 and 22 are sequentially brought into meshing engagement with the sprocket teeth T in the same sequence as set forth above in relation to FIG. 2.

It can be appreciated that the meshing teeth 26 of the link plates 18, 22 and the sprocket teeth T are protected against wear and, hence, the silent chain 10 and the sprocket S have a prolonged lifetime. The silent chain 10 can maintain its prescribed meshing sound suppressing effect over a long period of use.

Figure 3:
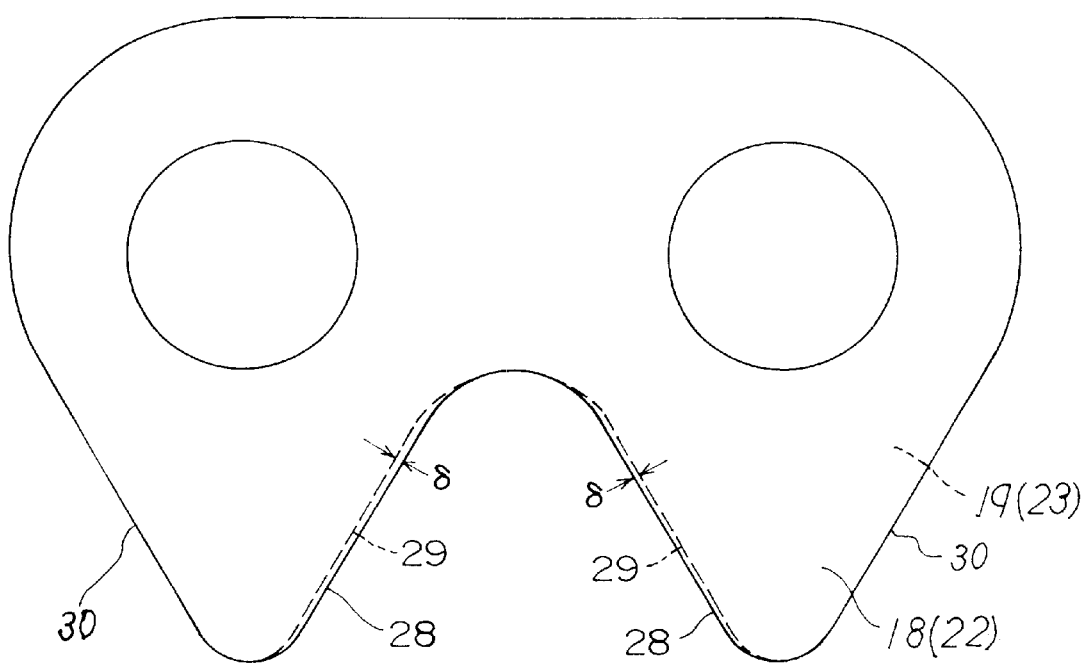
FIG. 3 is an enlarged front elevational view showing two different profiles of inside flanks link plates in the silent chain.

It is important to note that in the preferred embodiment of the present invention, as shown in FIG. 3, the guide link plate 18 or the articular link plates 22 are comprised of at least two types of link plates 16, 17 or 22, 23 each having a pair of meshing teeth of a different profile so as to provide two or more different projecting lengths of inside flanks. These link plates 16, 17 or 22, 23 are arranged either in a random or irregular fashion, or in a regular alternate fashion, along the length of the silent chain 10, so that the projecting lengths of the inside flanks relative to the laterally adjacent outside flanks are allowed to vary between at least two adjacent ones of the guide and articular link pairs 12, 14.

As understood from FIG. 3, due to the differently profiled sets of meshing teeth, the symmetrical inside flanks 28, 28 of a first link plate 18 or 22 may have a projecting length relative to laterally adjacent outside flanks (not shown) which is greater by a distance δ than a projecting length of the symmetrical inside flanks 29, 29 of a second link plate 19 or 23.

In one preferred form, the guide link plate 18 is comprised of the first and second link plates 18, 19 in which instance the articular link plates 22 are comprised of the first link plate 18 or the second link plate 19. This is practically the same as the combination of a guide link plate 18 composed of one of the first and second link plates 18, 19 and articular link plates 22 composed of the other link plate 19 or 18.

By thus providing different projecting lengths of the inside flanks, the sliding engagement start time of the sprocket teeth T relative to the inside flanks 28, 29 of the individual link plates is allowed to vary between the adjacent links 12, 14, so that periodic meshing sounds can be prevented from resonating and thereby getting louder, with the result that the overall noise level can be minimized. The sound resonance preventing effect can be emphasized by arranging the two or more different types of link plates 18, 22 and 19, 23 irregularly in a random mixture along the length of the silent chain 10.

Figure 4:
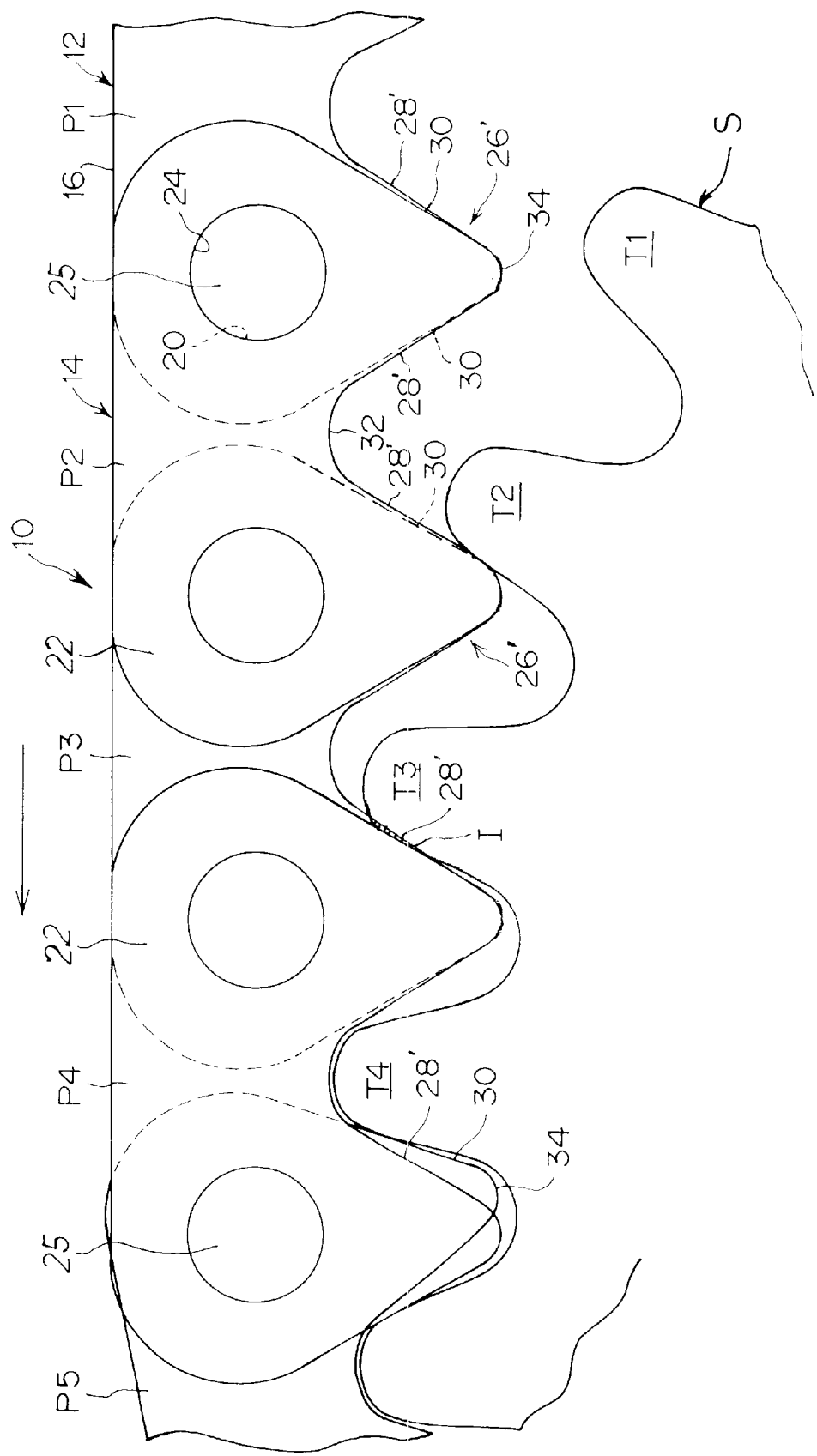
FIG. 4 is a view similar to FIG. 2, but showing a modification of the profile of meshing teeth of the link plates according to the present invention.
Figure 5:
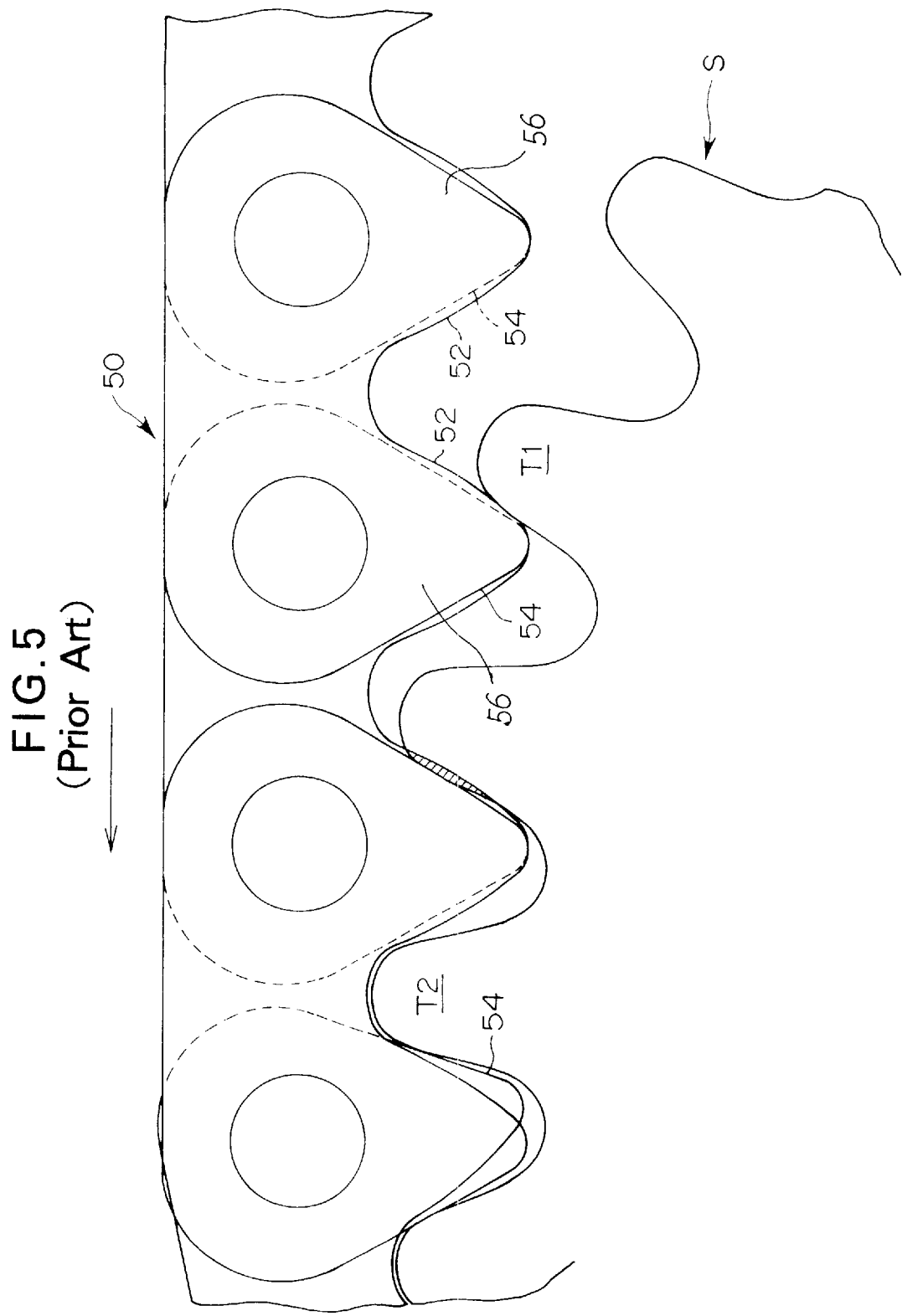
FIG. 5 is an enlarged front elevational view explanatory of an operational sequence in which link plates of a conventional silent chain sequentially mesh with teeth of a sprocket.

FIG. 4 shows a modification in profile of the meshing teeth of the link plates according to the present invention. The modified meshing teeth 26' are different from the meshing teeth 26 of the first embodiment shown in FIG. 2 in that, when the silent chain 10 is in the straight-line state, the inside flank 28' of each meshing tooth 26' extends at an angle to the outside flank 30 of another laterally adjacent tooth and has a projecting length relative to the outside flank 30 which varies by decreasing gradually toward a tip 34 of the tooth 26'.

By thus varying the projecting length of the inside flanks 28', the meshing engagement start time between the outside flanks 30 and the corresponding sprocket teeth T can be advanced. Though not shown, it can readily be appreciated that the inside flanks may alternatively have a projecting length so varying as to increase gradually toward the tips of the meshing teeth. In the latter case, the radial position on the chain's outside flanks with which the sprocket teeth mesh is allowed to shift toward the roots of the teeth.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain for use with a toothed sprocket, comprising:

guide links and articular links alternately arranged in the longitudinal direction of said chain;

each of said guide links having a pair of guide plates and at least one guide link plate disposed laterally between said guide plates, said guide plates each having a pair of pin holes spaced in the longitudinal direction of said chain and, said guide link plate having a pair of pin holes spaced in the longitudinal direction of said chain;

each of said articular links having at least two laterally aligned articular link plates each having a pair of pin holes spaced in the longitudinal direction of said chain;

each of said guide links and an adjacent one of said articular links being articulately connected together by a pivot pin inserted through one of said pair of pin holes in each of said guide plates, one of said pair of pin holes in said guide link plate and one of said pair of pin holes in each of said articular link plates;

said guide link plate having a pair of teeth designed to engage the sprocket, each of said teeth being defined by an inside flank having a straight profile and an outside flank having a straight profile;

said articular link plates each having a pair of teeth designed to engage the sprocket, each of said teeth being defined by an inside flank having a straight profile and an outside flank having a straight profile;

when said silent chain is in a straight-line state, said inside flank of said guide link plate of any one of said guide links projects outwardly from said outside flank of each of said articular link plates of a preceding one of said articular links, and said inside flank of each of said articular link plates of any one of said articular links projects outwardly from said outside flank of said guide link plate of a preceding one of said guide links; and when said silent chain is wrapping itself around the sprocket with the adjacent guide and axticular links being in a flexed state, said inside flank of said guide link plate of any one of said guide links retracts inwardly from said outside flank of each of said articular link plates of a preceding one of said articular links, and said inside flank of each of said articular link plates of any one of said articular links retracts inwardly from said outside flank of said outside flank of said guide link plates of a preceding one of said guide links, wherein said outside flank of said guide link plate and said outside flank of each said articular link plate have the same shape and configuration, and wherein one of said guide link plate and each said articular link plate is comprised of at least two types of link plates arranged in the longitudinal direction of said chain and each having a different inside flank designed such that when said chain is in the straight-line state, the inside flank of a first link plate of said at least two types of link plates has a first projecting length with respect to the outside flank of the other of said guide link plate and each said articular link plate of the preceding link, and the inside flank of a second link plate of said at least two types of link plates has a second projecting length with respect to the outside flank of sand other link plate of the preceding link, said first and second projecting lengths being different from each other.

2. A silent chain according to claim 1, wherein said first and second projecting lengths of the respective inside flanks of said first and second link plates are uniform throughout the lengths of the corresponding inside flanks.

3. A silent chain according to claim 1, wherein said first and second projecting lengths of the respective inside flanks of said first and second link plates vary to increase gradually toward a tip of the associated tooth.

4. A silent chain according to claim 1, wherein said first and second projecting lengths of the respective inside flanks of said first and second link plates vary to decrease gradually toward a tip (34) of the associated tooth.

5. A silent chain according to claim 1, wherein said other link plate is comprised of a single type of link plate and identical in shape and configuration with one of said first and second link plates.

6. A silent chain according to claim 5, wherein said first and second projecting lengths of the respective inside flanks of said first and second link plates are uniform throughout the lengths of the corresponding inside flanks.

7. A silent chain according to claim 5, wherein said first and second projecting lengths of the respective inside flanks of said first and second link plates vary to increase gradually toward a tip of the associated tooth.

8. A silent chain according to claim 5, wherein said first and second projecting lengths of the respective inside flanks of said first and second link plates vary to decrease gradually toward a tip of the associated tooth.

* * * * *

UNITED STATES PATENT AND TRADEMARK OFFICE
CERTIFICATE OF CORRECTION

PATENT NO. : 6,325,735 B1
DATED : December 4, 2001
INVENTOR(S) : Makoto Kanehira et al.

It is certified that error appears in the above-identified patent and that said Letters Patent is hereby corrected as shown below:

Column 1,
Line 17, "a" should be deleted;
Line 59, "projectina" should read -- projecting --;

Column 2,
Line 65, the second occurrence of "the" should be deleted;

Column 3,
Line 65, "a" should be deleted;

Column 5,
Line 7, "1a" should read -- 18 --;
Line 20, "a of" should read -- of a --;

Column 6,
Line 38, "23" should read -- P3 --;
Line 60, "A" should be deleted and "further" should read -- Further --;
Line 62, "PS" should read -- P5 --;

Column 7,
Line 2, "24" should read -- P4 --;

Column 8,
Line 59, "axticular" should read -- articular --;
Line 66, "of said outside flank" should be deleted;
Line 16, "sand" should read -- said --;

Signed and Sealed this

Twenty-ninth Day of October, 2002

Attest:

JAMES E. ROGAN
Attesting Officer   Director of the United States Patent and Trademark Office